J. G. HODGSON.
SOLDER CHARGED CAN CAP.
APPLICATION FILED DEC. 4, 1905.
928,975.
Patented July 27, 1909.
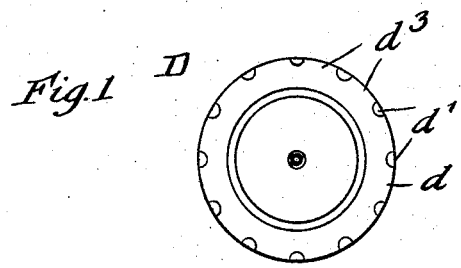
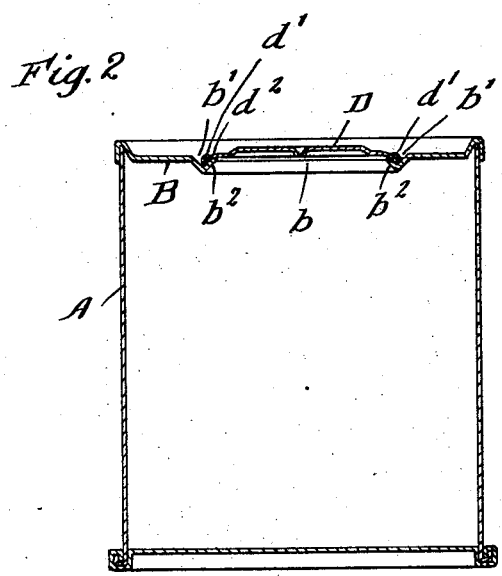
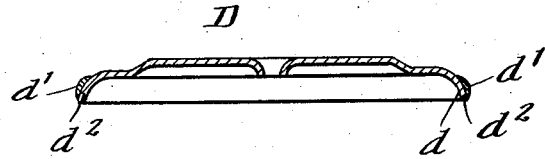
Witnesses:
Wm. Geiger
N. M. Munday
Inventor:
John G Hodgson
By Munday, Evarts & Adcock.
Attorneys

UNITED STATES PATENT OFFICE.

JOHN G. HODGSON, OF CHICAGO, ILLINOIS, ASSIGNOR TO AMERICAN CAN COMPANY, OF NEW YORK, N. Y., A CORPORATION OF NEW JERSEY.

SOLDER-CHARGED CAN-CAP.

No. 928,975.     Specification of Letters Patent.     Patented July 27, 1909.

Application filed December 4, 1905. Serial No. 290,099.

*To all whom it may concern:*

Be it known that I, JOHN G. HODGSON, a citizen of the United States, residing in Chicago, in the county of Cook and State of Illinois, have invented a new and useful Improvement in Solder-Charged Can-Caps, of which the following is a specification.

My invention relates to can caps which are used for closing the stud holes or filling openings in the tops or upper heads of sheet metal cans after the cans have been filled. Heretofore it has been customary to provide the rims of these can caps with the necessary solder for soldering the same to the head of the can either by hemming the rim of the can cap with a thin ring of sheet solder which is folded over the flange or rim of the can cap as shown and described, for example, in the E. Norton patents, Nos. 364,662 and 364,663, or else by fusibly uniting an annular edge or ridge of solder on the annular flange or rim of the can cap as shown and described, for example, in my Patent No. 434,868 of August 19th. 1890; but both these constructions are somewhat expensive to manufacture and are further open to the objection that an unnecessary and wasteful amount of solder is consumed.

The object of my invention is to provide a solder charged can cap of a simple and efficient construction, capable of being rapidly and cheaply manufactured, in which the solder will be fusibly united with the tin coating of the tin plate of which the can cap is made, and wherein the minimum quantity of solder necessary for soldering the can cap to the can head may be applied, and at the same time properly distributed.

My invention consists in the means I employ to practically accomplish this object or result. That is to say, it consists in a can cap having its annular soldering rim or flange furnished with a plurality of drops or beads of solder fusibly united to the tin coating of the cap rim at intervals around its circumference, the drops or beads of solder being spaced farther apart or closer together as desired, according to the amount of solder which it is desired to apply.

In the accompanying drawing forming a part of this specification, Figure 1 is a plan view of a solder charged can cap embodying my invention. Fig. 2 is a detail sectional view showing the cap applied to a can and ready to be soldered in place, the section being taken through one of the drops or beads of solder; and Fig. 3 is an enlarged cross-section of the can cap.

In the drawing, A represents a sheet metal can having a head B furnished with the customary stud hole or filling opening $b$ and surrounded by the customary annular cap groove $b^1$.

D is the can cap, the same having a soldering flange or rim $d$ which fits in the cap groove $b^1$ of the can top or head B. The rim $d$ of the can cap is furnished with a plurality of small drops or beads of solder $d^1$ which are fusibly united with the tin coating $d^2$ of the tin plate of which the cap D is formed. The soldering flange or rim $d$ of the cap D has free spaces $d^3$ intervening between the fusibly united drops or beads of solder $d^1$. By placing the series of drops or beads of solder $d^1$ closer together or farther apart, a greater or less quantity of solder may be applied to the cap as desired, and at the same time properly distributed about the entire circumference of the soldering flange or rim $d$ of the cap.

In manufacturing my improved can caps, I simply through a suitable solder dropping head or nozzle discharge the required number of drops of solder upon the rim of the can cap, the same congealing and fusibly uniting themselves with the tin coating the moment the drops of solder strike the surface of the cap. My solder charged caps may thus be manufactured very rapidly and cheaply and the exact quantity of solder desired or required securely and immovably fixed upon the cap. The drops or beads of solder are preferably fusibly united to the cap upon the outer or upper surface of its soldering flange or rim $d$, as this enables the soldering flange or rim to fit snugly and closely against the corresponding flange or rim $b^2$.

I claim:—

1. A tin can cap having a plurality of separate and individually distinct drops or beads of solder fusibly united to the tin coating of its rim and regularly disposed at intervals about its circumference with free spaces between such drops, substantially as specified.

2. A tin can cap having a soldering flange or rim provided on the upper or outside face thereof with a plurality of regularly disposed uniform drops or beads of solder separate and individually distinct from each other fusibly united with the tin coating of said flange or rim with free spaces between such drops, substantially as specified.

3. A solder charged tin can cap having a soldering flange or rim provided at intervals throughout its circumference with solder fusibly united to the tin coating thereof in separate and individually distinct drops or beads, and having also free spaces at regularly disposed intervals between such drops throughout the circumference of its rim, substantially as specified.

4. A tin plate can blank having its margin provided at intervals with a plurality of regularly disposed solder drops or beads separate and individually distinct from each other fusibly united with the tin coating of the blank with free spaces between such drops, substantially as specified.

JOHN G. HODGSON.

Witnesses:
H. M. MUNDAY,
WILLIAM A. GEIGER.